UNITED STATES PATENT OFFICE.

JOHN H. SMITH, OF BROOKLYN, NEW YORK.

IMPROVEMENT IN SEPARATING STEARINE FROM ELAINE.

Specification forming part of Letters Patent No. 2,534, dated April 1, 1842.

*To all whom it may concern:*

Be it known that I, JOHN H. SMITH, of the city of Brooklyn, in the county of Kings and State of New York, have invented a new and useful Improvement in the Manner of Separating from each other the Elaine and Stearine which are Contained in Lard, by means of which improved process the operation is much facilitated and the products are obtained in a high degree of purity; and I do hereby declare that the following is a full and exact description thereof.

The first process to be performed upon the lard is that of boiling, which may be effected either by the direct application of fire to the kettle or by means of steam. When the latter is employed I cause a steam-tube to descend from a steam-boiler into the vessel containing the lard. This tube may descend to the bottom of the vessel and be coiled round on said bottom, so as to present a large heating-surface to the lard, provision being made for carrying off the water and waste steam in a manner well known; but I usually perforate this tube with numerous small holes along the whole of that portion of it which is submerged below the lard, thus allowing the whole of the steam to pass into and through the lard. To operate with advantage, the vessel in which the boiling is effected should be of considerable capacity, holding, say, from ten to a hundred barrels. The length of time required for boiling will vary much, according to the quality of the lard. That which is fresh may not require to be boiled for more than four or five hours, while that which has been long kept may require twelve hours. It is of great importance to the perfecting of the separation of the stearine and elaine that the boiling should be continued for a considerable period, as above indicated.

My most important improvement in the within-described process consists in the employment of alcohol, which I mix with the lard in the kettle or boiler at the commencement of the operation. When the lard has become sufficiently fluid I gradually pour and stir into it about one gallon of alcohol to every eighty gallons of lard, taking care to incorporate the two as intimately as possible, and this has the effect of causing a very perfect separation of the stearine and elaine from each other by the spontaneous granulation of the former which takes place when the boiled lard is allowed to cool in a state of rest. I sometimes combine camphor with the alcohol, dissolving about one-fourth of a pound in each gallon of alcohol, which not only gives an agreeable odor to the products, but appears to co-operate with the alcohol in effecting the object in view. The camphor, however, is not an essential ingredient, and may be omitted. Spirit of lower proof than alcohol may be used, but not with equal benefit. After the boiling of the lard with the alcohol has been continued for a sufficient length of time the fire is withdrawn or the supply of steam cut off, and the mass is allowed to cool sufficiently to admit of its being ladled or drawn off into hogsheads or other suitable coolers, where it is to be left at perfect rest until it has cooled down and acquired the ordinary temperature of the atmosphere. As the cooling proceeds the granulation consequent upon the separation of the stearine and elaine will take place and become perfect. The material is then to be put into bags and pressed moderately under a press of any suitable kind, which will cause the elaine to flow out in a state of great purity, there not being contained within it any appreciable portion of stearine. This pressure is to be continued until the stearine is as dry as it can be made in this way. The masses of the solid material thus obtained are to be remelted, and in this state to be poured into boxes or pans of a capacity of ten or twelve gallons and allowed to form lumps, which I denominate "blocks." These, when removed from the vessels, are piled or stacked up for a week or ten days, more or less. The room containing it should be at a temperature of nearly 80°, which will cause a sweating or oozing from the blocks, and they will improve in quality. The blocks are then to be rolled in clothes or put into bags and these placed between plates and submitted to very heavy pressure by means of a hydraulic press. After this pressure it is brought again into the form of blocks, and these are to be cut up by means of revolving or other knives or cutters. The pieces thus obtained are to be put into bags and subjected to the action of hot water or of steam in a press until it becomes hard enough to be manufactured into candles or put up for other purposes to which it may be desired to apply it. The manner of subjecting it to the action of heated water or steam is to place the bags containing the stearine in a box or chest, into which heated water or steam may be introduced, but not to such extent as to fuse the stearine. A follower is then to be forced against the bags contained in the box or chest and moderate pressure made upon them. The material will now be found to have acquired all the required hardness and to possess a wax-like consistence, such as would generally cause it to be mistaken for wax.

I am aware that alcohol has been used for the purpose of separating elaine and stearine from each other in analytical chemistry; but the lard or other fatty matter consisting of these substances has in this case been dissolved in the heated alcohol and the whole has been suffered to cool together. This process would be altogether inapplicable to manufacturing purposes—the cost would exceed the value of the product. In my manufacturing process, instead of dissolving the lard in alcohol, I add a small proportionate quantity of the latter to the former, the whole of which is driven off at an early period of the ebullition, but by its presence (or catalytically) disposes the elaine and stearine to separate from each other, which they do after long boiling and subsequent cooling. I do not therefore claim the use of alcohol in separating elaine and stearine from each other by dissolving the fatty matter in heated alcohol and by subsequently cooling the solution; but

What I claim as of my invention, and wish to secure by Letters Patent, is—

The within-described method of effectively promoting their separation by incorporating alcohol or highly-rectified spirits with the lard in small proportionate quantities—say one gallon (more or less) of such alcohol or spirit to eighty gallons of lard—and then boiling the mixture for several hours, by which boiling the whole of the alcohol will be driven off, but will have left the elaine and stearine with a disposition to separate from each other on subsequent cooling, as herein indicated and made known.

JOHN H. SMITH.

Witnesses:
T. H. PATTERSON,
H. S. FITCH.